(12) United States Patent
Bhaskar et al.

(10) Patent No.: US 10,404,577 B2
(45) Date of Patent: Sep. 3, 2019

(54) NETWORK COMPATIBILITY DETERMINATION BASED ON FLOW REQUIREMENTS OF AN APPLICATION AND STORED FLOW CAPABILITIES OF A SOFTWARE-DEFINED NETWORK

(71) Applicant: HEWLETT PACKARD ENTERPRISE DEVELOPMENT LP, Houston, TX (US)

(72) Inventors: Abhay Bhaskar, Bangalore (IN); Rangaprasad Sampath, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 168 days.

(21) Appl. No.: 15/500,822

(22) PCT Filed: Nov. 4, 2014

(86) PCT No.: PCT/US2014/063836
§ 371 (c)(1),
(2) Date: Jan. 31, 2017

(87) PCT Pub. No.: WO2016/032552
PCT Pub. Date: Mar. 3, 2016

(65) Prior Publication Data
US 2018/0337848 A1 Nov. 22, 2018

(30) Foreign Application Priority Data

Aug. 28, 2014 (IN) .......................... 4213/CHE/2014

(51) Int. Cl.
*H04L 12/721* (2013.01)
*H04L 12/64* (2006.01)
*H04L 12/751* (2013.01)

(52) U.S. Cl.
CPC .......... *H04L 45/14* (2013.01); *H04L 12/6418* (2013.01); *H04L 45/02* (2013.01)

(58) Field of Classification Search
CPC ....... H04L 45/14; H04L 45/02; H04L 45/306; H04L 45/38; H04L 47/2433; H04L 47/2475
See application file for complete search history.

(56) References Cited

U.S. PATENT DOCUMENTS

2013/0250770 A1 9/2013 Zou et al.
2013/0266007 A1\* 10/2013 Kumbhare ............. H04L 45/56
370/389

(Continued)

FOREIGN PATENT DOCUMENTS

CN 103346922 A 10/2013
CN 103795596 A 5/2014
WO WO-2013104375 A1 7/2013

OTHER PUBLICATIONS

IQ.com search, NPL, Mar. 6, 2019 (Year: 2019).\*

(Continued)

*Primary Examiner* — Benjamin H Elliott, IV
(74) *Attorney, Agent, or Firm* — Hewlett Packard Enterprise Patent Department

(57) ABSTRACT

In one example, a software-defined networking (SDN) controller can access flow capability information for flow paths along network data path elements in the control plane of the SDN controller. The SDN controller can determine network compatibility for an SDN controller application based on whether the accessed flow capability information fails to meet a flow requirement for the application. The SDN controller can further notify the application when it is determined that the flow requirements for the application are (Continued)

not met by a flow path. Related methods and machine-readable storage mediums are also described.

13 Claims, 5 Drawing Sheets

(56) References Cited

U.S. PATENT DOCUMENTS

| | | | |
|---|---|---|---|
| 2013/0329734 A1 | 12/2013 | Chesla et al. | |
| 2014/0052836 A1* | 2/2014 | Nguyen | H04L 45/306 709/223 |
| 2014/0089506 A1 | 3/2014 | Naga et al. | |
| 2014/0146674 A1* | 5/2014 | Wang | H04L 45/38 370/235 |
| 2014/0173018 A1 | 6/2014 | Westphal et al. | |
| 2014/0177634 A1* | 6/2014 | Jiang | H04L 45/64 370/392 |
| 2014/0226467 A1 | 8/2014 | Park | |
| 2014/0241247 A1* | 8/2014 | Kempf | H04L 12/4633 370/328 |
| 2016/0065454 A1* | 3/2016 | Arumugam | H04L 45/38 370/389 |
| 2016/0218957 A1* | 7/2016 | Liang | H04L 45/64 |
| 2016/0344633 A1* | 11/2016 | Jiao | H04L 29/06 |
| 2017/0034005 A1* | 2/2017 | Liang | H04L 41/12 |
| 2018/0337848 A1* | 11/2018 | Bhaskar | H04L 12/6418 |

OTHER PUBLICATIONS

IQ.com search, Patent/PGPub, Mar. 6, 2019 (Year: 2019).*
"Software-Defined Networking: Why We Like it and How we Are Building on It," White Paper, Apr. 10, 2013, pp. 1-4, Cisco.
International Search Report and Written Opinion, International Application No. PCT/US2014/063836, dated May 11, 2015, pp. 1-9, KIPO.
The Open Networking Foundation, "OpenFlow Switch Specification", Version 1.3.0 ( Wire Protocol 0x04 ), Jun. 25, 2012, 106 pages.
Open Networking Foundation, "Software-Defined Networking: The New Norm for Networks", White Paper, Apr. 2012, 12 pages.
Open Networking Foundation, "OpenFlow Management and Configuration Protocol", OF-CONFIG 1.2, Version 1.2, ONF TS-016, 44 pages, published 2014.
"Ryu—An open source OpenFlow controller" (webpage), available online at <http://osrg.github.io/ryui>, 2017, 2 pages.
"CPqD/NOX 1.3 controller", (webpage), available online at <https://github.com/CPqD/nox13oflib>, 2013, 2 pages.

* cited by examiner

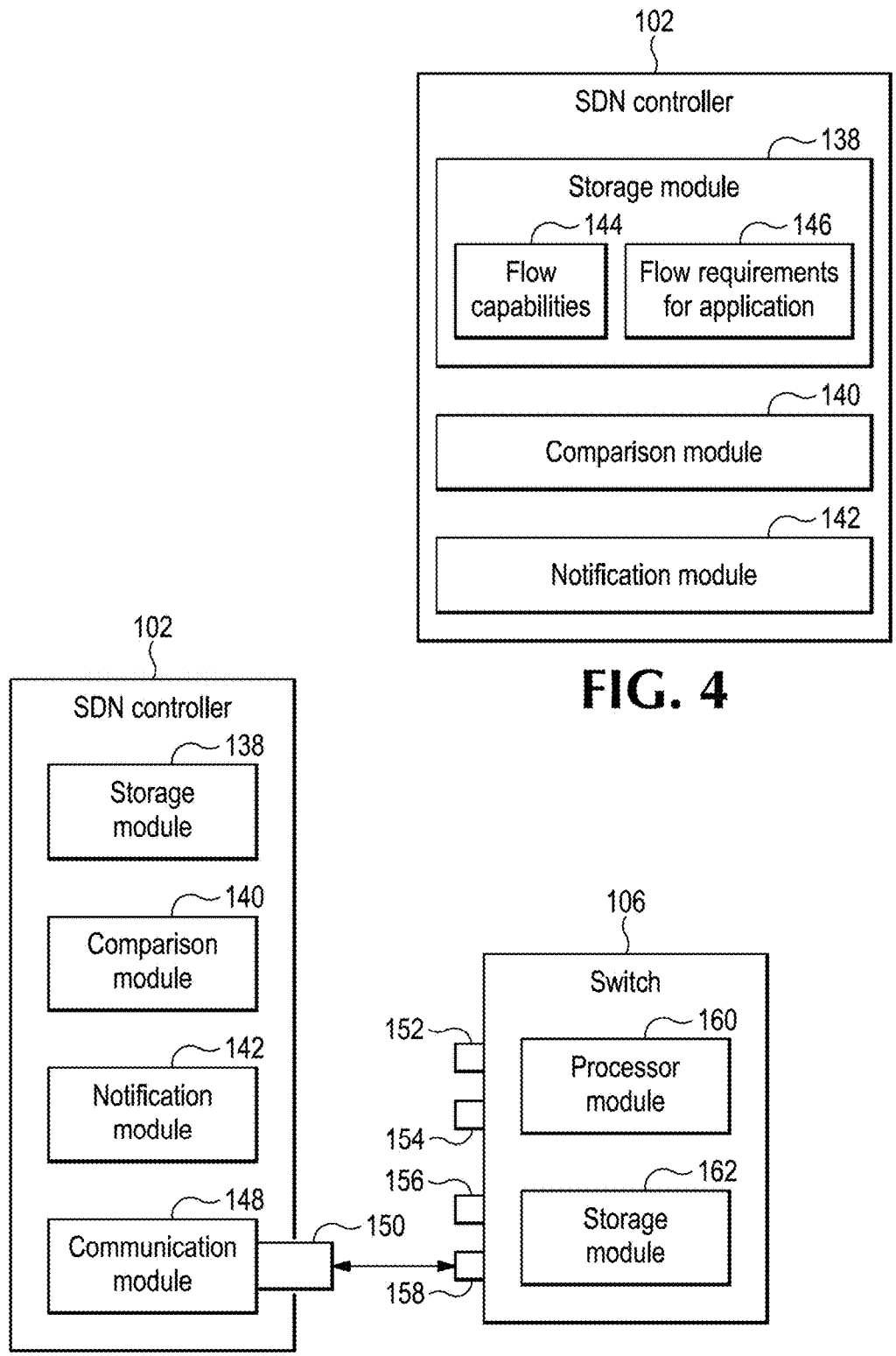

NETWORK COMPATIBILITY DETERMINATION BASED ON FLOW REQUIREMENTS OF AN APPLICATION AND STORED FLOW CAPABILITIES OF A SOFTWARE-DEFINED NETWORK

BACKGROUND

In a software-defined network (SDN), control decisions for routing traffic through the network can be decoupled from the network's physical infrastructure. For example, in some SDNs, a network controller can instruct network switches to flow traffic along a selected routing path defined by network switches. Other functionality can be achieved through the use of software-defined networking. For example, SDN applications can be installed on or interface with a network controller to meet customer use cases, such as to achieve a desired throughput or other quality of service.

BRIEF DESCRIPTION OF DRAWINGS

FIG. 4 is a diagram of an SDN controller according to an example.

FIG. 5 is a diagram of an SDN controller in communication with a network switch, according to an example.

DETAILED DESCRIPTION

In an SDN, each SDN-compatible network data path element (such as an SDN-compatible network switch) can have a diverse set of capabilities. Applications for managing SDNs can be designed to require a certain set of capabilities for operation or may make control decisions for the SDN based on the capabilities of each network data path element. Although certain switch capabilities can typically be found in documentation from the vendor, this information can be cumbersome to access and can change based on firmware or other software upgrades. Due to the increasing complexity of modern SDN arrangements, it can be challenging for a network administrator to determine whether a specific SDN application could actually be successfully deployed on an SDN network and whether adding or removing a data path element would affect the compatibility of the SDN application. As a result, network administrators will often test compatibility through a trial-and-error approach and may be hesitant to make large changes to SDNs so as to minimize troubleshooting difficulties.

Certain implementations of this disclosure address these issues by providing an SDN controller service that maps SDN application requirements with capabilities advertised by SDN-compatible network data path elements along a data flow path. Certain implementations can, for example, use the advertised capabilities to determine in real time if the underlying network can support a SDN application given its flow requirements. An SDN application developer can, for example, rely on such an SDN controller service to design for cases when the underlying network can no longer support the application's flow requirement, such as by instructing an SDN controller to take an alternative flow signature or work with a lower scale.

Figure 1:
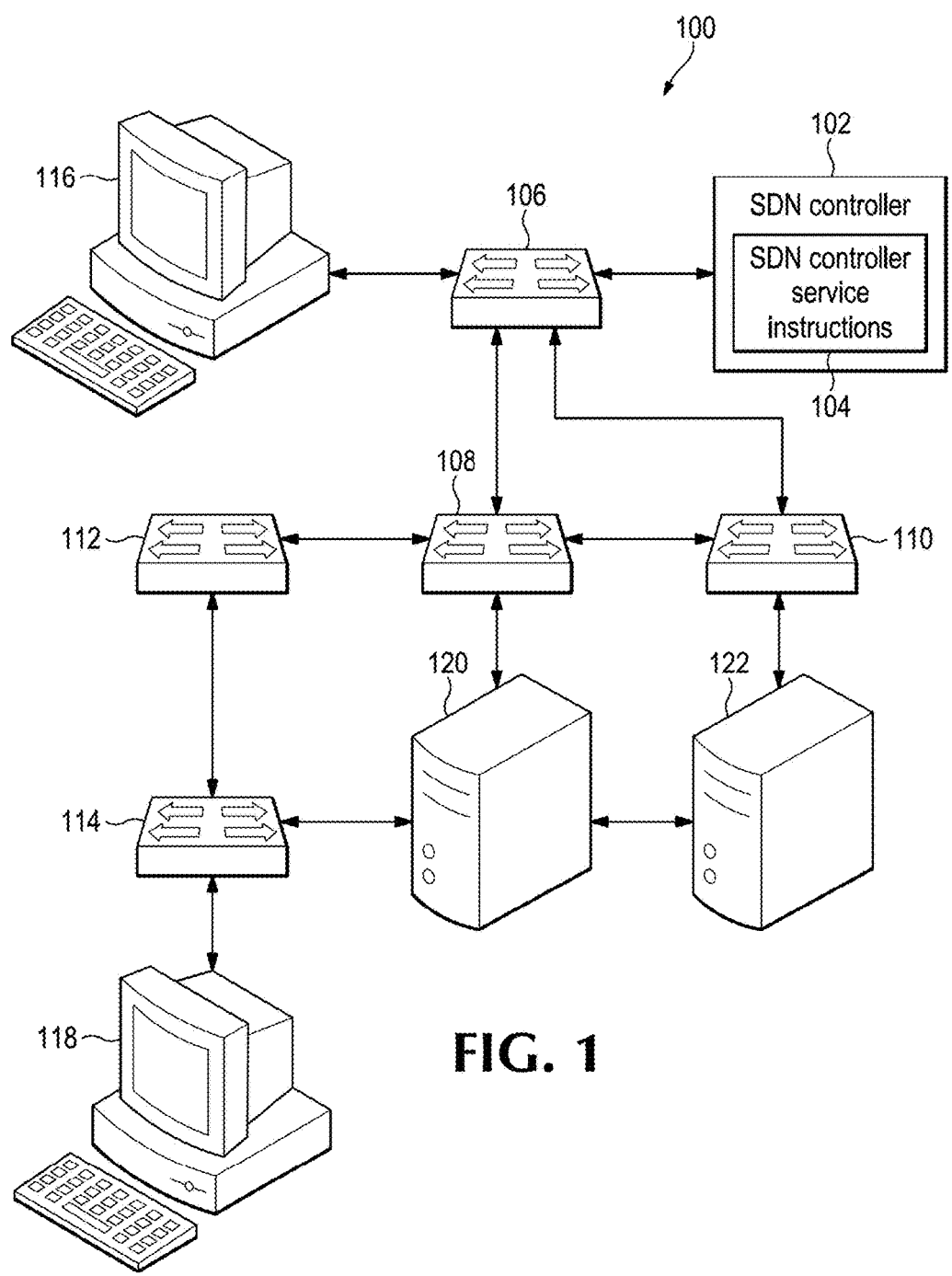
FIG. 1 is a diagram of a software-defined network including an SDN controller with SDN controller service instructions, according to an example.

FIG. 1 depicts a diagram of one example of a software-defined network (SDN) 100 including an SDN controller 102 running SDN controller service instructions 104. SDN controller 102 is connected to multiple network nodes 106, 108, 110, 112, 114, 116, 118, 120, and 122 via various wired or wireless data links. SDN 100 can be implemented through the use of a SDN controller 102 that interfaces with various SDN-compatible devices via a suitable Application Program Interface ("API"), or another suitable protocol (e.g., OpenFlow and/or simple network management protocol (SNMP)). In some implementations, SDN controller 102 may interface with controlled network devices via an interface channel that connects each controlled device to SDN controller 102 to allow SDN controller 102 to configure and manage each device, receive events from each device, and send packets using each device. As used herein, the term "controlled" in the context of SDN-compatible network data path elements, such as "controlled switches," is intended to include devices within the control domain of SDN controller 102. Such a controlled switch can, for example, communicate with SDN controller 102 and SDN controller 102 is able to manage the switch in accordance with an SDN protocol, such as the Open Flow protocol. For example, an OpenFlow-compatible switch controlled by SDN controller 102 can permit SDN controller 102 to add, update, and delete flow entries in flow tables of the switch using suitable SDN commands. Each flow entry in a flow table can contain information such as: (1) match fields to match against packets (e.g., an ingress port and packet headers), (2) a priority value for the flow entry to allow prioritization over other flow entries, (3) counters that are updated when packets are matched, (4) instructions to modify the action set or pipeline processing, (5) timeouts indicating a maximum amount of time or idle time before a flow is expired by the switch, and (5) a cookie value which can be used by the controller to filter flow statistics, flow modification, and flow deletion.

In the example SDN 100 depicted in FIG. 1, the various network nodes are in the form of network data path elements (controlled network switches 106, 108, 110, 112, and 114) and host devices (personal computers 116 and 118 and servers 120 and 122). It is appreciated however, that the improved systems, methods, and mediums described herein can be used or adapted for networks including more or fewer devices, different types of devices, and different network arrangements. For example, in some implementations, other data communication equipment (such as suitable modems, hubs, and bridges) and other host devices (such as suitable Wi-Fi access points or IP phones) can be included. It is further appreciated that the disclosure herein can apply to suitable SDNs (e.g., certain hybrid or heterogeneous SDNs) in which a subset of devices are controlled by an SDN controller and another subset of devices are not controlled by the SDN controller.

The functionality of SDN controller 102 can, for example, be implemented in part using a software program on a standalone machine, such as a server. In some implementations, SDN controller 102 can be implemented on multi-purpose machines, such as a suitable desktop computer, laptop, tablet, or the like. In some implementations, SDN controller 102 can be implemented on a suitable non-host network node, such as certain types of network switches. It is appreciated that the functionality of SDN controller 102 may be split among multiple controllers or other devices. For example, SDN 100 is described and illustrated as including only one SDN controller 102. However, it is appreciated that the improved systems, methods, and mediums described herein can be implemented in SDNs with multiple controllers. For example, in some SDNs, network devices are in communication with multiple controllers such that control of the network can be smoothly handed over from a first controller to a second controller if a first controller fails or is otherwise out of operation. As another example, multiple controllers can work together to concurrently control an SDN. In such SDNs, a first controller can, for example, control certain network devices while a second controller can control other network devices. In view of the above, reference in this application to a single SDN controller 102 that controls the operation of SDN 100 is intended to include such multiple controller configurations (and other suitable multiple controller configurations).

Figure 2:
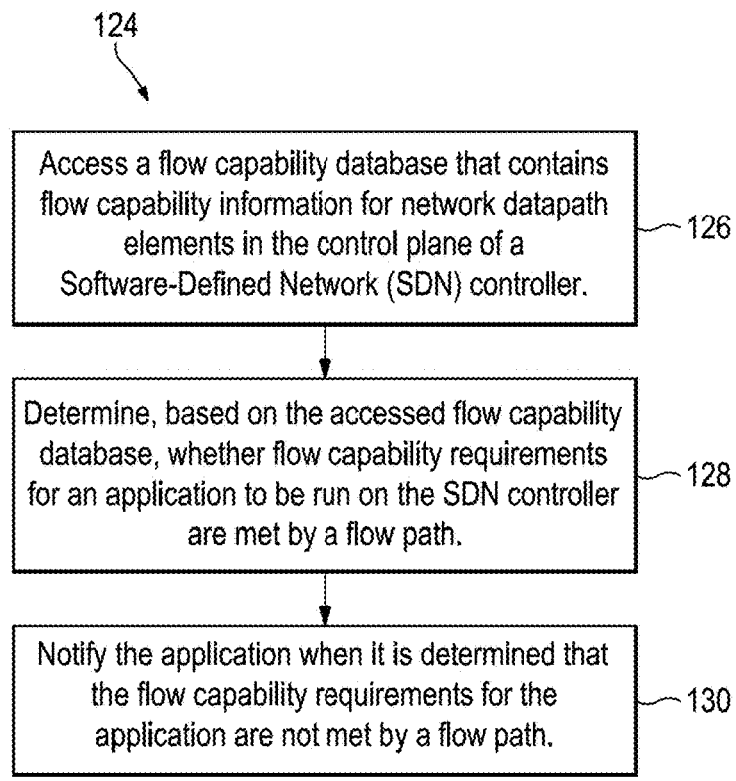
FIG. 2 is a flowchart illustrating a method, according to an example.

FIG. 2 illustrates a flowchart for a method 124 relating to the use of an SDN controller service running on an SDN controller. The description of method 124 and its component steps make reference to elements of example SDN 100, such as SDN controller 102 for illustration, however, it is appreciated that this method can be used for any suitable network or network element described herein or otherwise. Method 124 includes a step 126 of SDN controller 102 accessing a flow capability database that contains flow capability information for network data path elements within the control plane of a Software-Defined Network (SDN) controller. Flow capability information stored in the flow capability database can, for example, include information relating to a network data path element's capabilities regarding flow match field, flow packet modifications, type of egress action, and number of flows.

This information can, for example, be determined from information received via a suitable SDN protocol command, such as the OFPMP_TABLE_FEATURES command for OpenFlow compatible switches. Using this command, SDN controller 102 can instruct a controlled switch to communicate the specific details of the OpenFlow pipeline it supports and provides a mechanism for the switch to advertise the flow tables that it supports as part of its OpenFlow pipeline as well as the capabilities & capacities of each of those flow tables. For example, the OFPMP_TABLE_FEATURES command can instruct the switch to communicate details regarding an OpenFlow table in its pipeline: (a) table ID, (b) max number of entries, (c) metadata match and write, (d) match fields supported, (e) instruction types supported, and (f) packet modifications supported.

Figure 6:
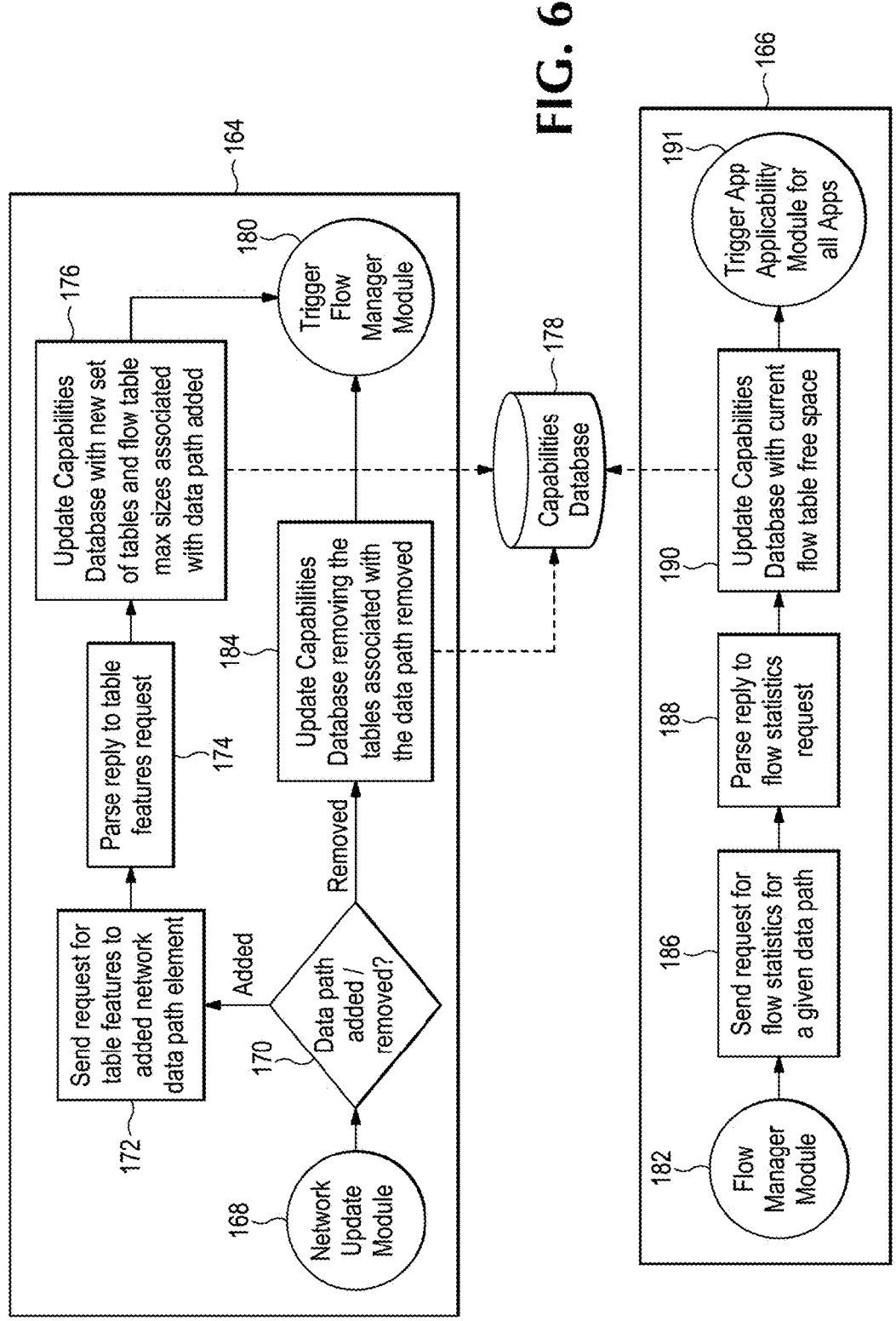
FIG. 6 is a flowchart illustrating a node manager service and flow manager service for an SDN controller service, according to an example.

In some implementations, the SDN controller service accesses the flow capability database, but does not itself create the database. For example, the database can be created by a vendor or network administrator. In some implementations, however, method 124 can include a separate step of SDN controller 102 creating the flow capability database or amending the flow capability database. FIG. 6, which is described further below, depicts a flow chart including steps relating to amending a flow capability database when a data path is added or removed. In some implementations, a first sub-step of creating the flow capability database can include querying each network data path element 106, 108, 110, 112, and 114 in the control plane of SDN controller 102 regarding its table capabilities. Each network data path element can, for example, be queried via a suitable features request command, such as the OFPMP_TABLE_FEATURES command for OpenFlow compatible switches. In some implementations, a step of creating the flow capability database can include a second sub-step of receiving table capability information for each queried network data path element. Such capability information can be provided to SDN controller 102 directly by a queried network data path element or may be provided to SDN controller 102 through an intermediary element or device.

In some implementations, a step of creating the flow capability database can include a third sub-step of determining flow capability information for each queried network data path element based on the received table capability information for each queried network data path element and a fourth sub-step of storing in the flow capability database the determined flow capability information for each queried network data path element. Flow capability information can, for example, be determined for a given flow path based on the capability information for each network data path element within the flow path. For illustration, a potential flow path can include two switches, with a first switch configured to allow a first maximum number of entries and a second switch configured to allow a second maximum number of entries. This information can be entered in the flow capability database for the potential flow path. For some flow path capabilities, the capabilities of all network data path elements in the flow path are used to determine the overall capabilities of a flow path. For example, an overall maximum number of entries for a given flow path can be determined to be the lesser of the first and second maximum number of entries for the two switches in the example flow path above. For some flow path capabilities, the presence of a single network data path element including a capability, such as an ability to modify packets, may be sufficient to determine a capability for the entire flow path.

Method 124 includes a step 128 of SDN controller 102 determining, based on the accessed flow capability database, whether flow capability requirements for an application to be run on SDN controller 102 are met by a flow path along network data path elements. Applications to be run on SDN controller 102 can include Quality of Service (QoS) applications, security applications, network forwarding applications, energy efficiency applications, or other types of applications.

Step 128 can, for example, be accomplished by comparing a flow capability requirement value to a flow capability value for a given flow path. For example, if an SDN application requires that a given flow path be able to support 10,000 table entries, step 128 can include determining, based on the flow capability information for a given flow path in the database, whether the flow path can support more than 10,000 table entries. It is appreciated that step 128 can include any suitable determination calculation, such as determinations based on multiple flow capabilities. For example, an SDN application may require that a given flow path be able to support 10,000 table entries if the flow path is unable to modify packets, but may require that a flow path be able to support only 5,000 table entries if the flow path is able to modify packets. It is appreciated that this determination can be based on any single flow requirement or combination of flow requirements that may be relevant in the SDN field.

Method 124 includes a step 130 of SDN controller 102 notifying the SDN application when it is determined that the flow capability requirements for the SDN application are not met by a flow path. It is appreciated, that in some implementations, step 130 of SDN controller 102 can include notifying the SDN application when it is determined that the flow capability requirements for the SDN application are not met by any flow paths within the SDN. That is, the failure of a given flow path (of many) may not warrant a notification to the SDN application if other flow paths are compatible with the application. A given flow path can, for example, be selected by a network administrator for evaluation. In some implementations, a set of flow paths are selected when a new network datapath element is added to the network. For example, any flow path created by the addition of a network datapath element can be selected for evaluation. In some implementations, every flow path is reevaluated when a new network datapath element is added to the network.

In some implementations, step 130 can include identifying a flow capability requirement that was determined as not being met by a flow path (or in some cases a network data path element in a given flow path). In some implementations, step 130 can include providing the application with a list of flow tables on each data path that support the flow capability requirements. It is appreciated that other notifications can provide additional or alternative information, such as identification of a network data path element that fails to meet a flow requirement. The form of the notification provided in step 130 (e.g., a message to the SDN application, an audio or visual indicator, etc.) can be based on the hardware of a notification module (see, e.g., notification module of FIG. 4). For example, if the hardware of the notification module includes a computer monitor, a notification can be in the form of a message on the computer monitor. Further description of an example notification module is provided below with respect to FIG. 4.

In some implementations, step 130 can include determining whether every switch requirement for an application to be run on the SDN controller is met by every corresponding switch capability for each network switch in the control domain of the SDN controller. Moreover, step 130 can include determining whether every switch requirement for every application to be run on the SDN controller is met by every corresponding switch capability for each network switch in the control domain of the SDN controller. In such implementations, notification step 130 can include sending an error message to any application when any switch capability fails to meet any switch requirement.

Method 124 can include a separate step of updating a flow capability database when SDN 100 is updated, such as when a network data path element is updated, added to SDN 100, and/or removed from SDN 100. Updating the flow capability database can include receiving, with SDN controller 102, an indication that a network data path element has been added to a control plane of SDN controller 102. Updating the flow capability database can include querying an added network data path element regarding its table capabilities. This querying step can be similar to the steps described above regarding determining table capabilities for a network data path element. For example, SDN controller 102 can send a network data path element an OFPMP_TABLE_FEATURES command that instructs the network data path element to communicate details regarding an OpenFlow table in its pipeline. Updating the flow capability database can include a sub-step of receiving table capability information for added network data path element. Updating the flow capability database can include a sub-step of determining flow capability information for added network data path element based on the received table capability information for added network data path element. Updating the flow capability database can include a sub-step of storing in the flow capability database the determined flow capability information for added data path element.

Method 124 can include a separate step of updating a flow capability database when a network data path element is removed from the network. Updating the flow capability database for a removed network data path element can include receiving, with SDN controller 102, an indication that a network data path element has been removed from a control plane of SDN controller 102. Updating the flow capability database under this condition can include updating the flow capability database to remove the flow capability information for the removed network data path element.

Although the flowchart of FIG. 2 and description of method 124 identify one order of performance, it is appreciated that this order may be rearranged into another suitable order, may be executed concurrently or with partial concurrence, include additional or comparable steps to achieve the same or comparable functionality, or a combination thereof.

Figure 3:
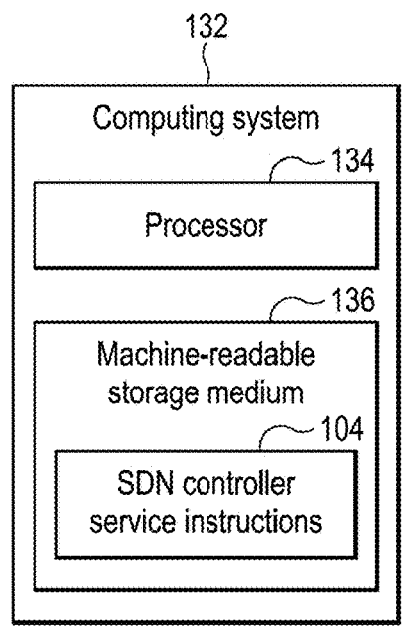
FIG. 3 is a diagram of a computing system according to an example.

FIG. 3 illustrates an example of a computing system 132 for running SDN controller service instructions to control a software-defined network. Computing system 132 can, for example, be used to execute one or more steps of method 124 described above. The description of computing system 132 refers to elements of SDN 100 for illustration, however, it is appreciated that computing system 132 can be used with any suitable network. Computing system 132 includes a processor 134 and machine-readable storage medium 136 as described further below. It is appreciated that computing system 132 can include additional elements, such as input/output (I/O) devices, a communication interface, etc. It is appreciated that one or hardware or software elements for SDN controller 102 described herein may be implemented in computing system 132.

Computing system 132 can be in the form of a suitable server, desktop computer, laptop, tablet, or the like. In some implementations, software that provides the functionality of SDN controller 102 can be stored on machine-readable storage medium 136 of computing system 132 to be executed by processor 134 of computing system 132. In some implementations, computing system 132 can be a standalone personal computer that is connected to SDN controller 102 so as to communicate with SDN controller 102 to execute one or more steps of method 124. In such implementations, computing system 132 can receive information from SDN controller 102 through direct or indirect means. For example, computing system 132 may communicate with SDN controller 102 by a wired data cable or wireless connection. In some implementations, computing system 132 communicates with SDN controller 102 through the use of a removable data storage device, such as a USB thumb drive or a storage disc.

Processor 134 of computing system 132 can, for example, be in the form of a central processing unit (CPU), a semiconductor-based microprocessor, a digital signal processor (DSP) such as a digital image processing unit, other hardware devices or processing elements suitable to retrieve and execute instructions stored in medium 136, or suitable combinations thereof. Processor 134 can, for example, include single or multiple cores on a chip, multiple cores across multiple chips, multiple cores across multiple devices, or suitable combinations thereof. Processor 134 can be functional to fetch, decode, and execute instructions as described herein. As an alternative or in addition to retrieving and executing instructions, processor 134 can, for example, include at least one integrated circuit (IC), other control logic, other electronic circuits, or suitable combination thereof that include a number of electronic components for performing the functionality of instructions stored on medium 136. Processor 134 can, for example, be implemented across multiple processing units and instructions may be implemented by different processing units in different areas of computing system 132.

SDN controller service instructions 104 can be executable by processor 134 such that computing system 132 is operative to perform one or more SDN controller services described herein, such as those described above with respect to method 124. Related data stored on medium 136 can, for example, include flow capabilities for one or more network data path elements and flow requirements for one or more SDN applications. It is appreciated that instructions and data can be stored on separate machine-readable storage mediums. For example, SDN controller service instructions 104 can be stored on a first machine-readable storage medium 136, flow capabilities can be stored in a database on a second machine-readable storage medium 136, and flow requirements for SDN applications can be stored on a third machine-readable storage medium 136. Multiple mediums can be treated as a single medium 136 for purposes of description.

Medium 136 of computing system 132 can, for example, be in the form of a non-transitory machine-readable storage medium, such as a suitable electronic, magnetic, optical, or other physical storage apparatus to contain or store information such as executable SDN controller service instructions 104, related data, and the like. Medium 136 can, for example, be housed within the same housing as processor 134 for computing system 132, such as within a computing tower case for computing system 132. In some implementations, medium 136 and processor 134 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, medium 136 can correspond to a memory including a main memory, such as a Random Access Memory (RAM), where software may reside during runtime, and a secondary memory. The secondary memory can, for example, include a nonvolatile memory where a copy of software is stored.

FIG. 4 illustrates SDN controller 102 in the form of functional modules that are operative to execute one or more steps of method 124 described above. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules. Each module of SDN controller 102 can include one or more machine-readable storage mediums, such as medium 136, and one or more computer processors, such as processor 134. For example, software that provides the functionality of modules on SDN controller 102 can be stored on a memory of a computer to be executed by a processor of the computer.

SDN controller 102 of FIG. 4 includes a storage module 138, a comparison module 140, and a notification module 142 as described below. It is appreciated that other modules can be added to SDN controller 102 for additional or alternative functionality. Storage module 138 is a functional module of SDN controller 102 that includes a combination of hardware and software that allows SDN controller 102 to store flow capabilities 144 for network data path elements in the control plane of SDN controller 102, to store flow requirements 146 for an application to be run on SDN controller 102, and, in some implementations, other related data. In some implementations, storage module 138 includes hardware in the form of a hard drive, related firmware, and other software for allowing the hard drive to operatively communicate with other hardware of SDN controller 102. Storage module 138 can include information that is stored within storage module 138, such as flow capabilities 144 and flow requirements 146 for applications.

Comparison module 140 is a functional module of SDN controller 102 that includes a combination of hardware and software that allows SDN controller 102 to determine whether one or more flow capabilities 144 retrieved from storage module 138 for a specific network data path element fails to meet one or more flow requirements 146 retrieved from storage module 138. In some implementations, comparison module 140 includes hardware in the form of a microprocessor on a single integrated circuit, related firmware, and other software for allowing the microprocessor to operatively communicate with other hardware of SDN controller 102. Comparison module 140 can include software instructions and/or algorithms used by SDN controller 102 to compare flow capabilities 144 to flow requirements 146. Comparison module 140 can, for example, include one or more machine-readable storage mediums, such as medium 136 described above with respect to FIG. 3, and one or more computer processors, such as processor 134 described above with respect to FIG. 3.

Notification module 142 is a functional module of SDN controller 102 that includes a combination of hardware and software that allows SDN controller 102 to send an error message to the application when one or more flow capabilities 144 retrieved from storage module 138 fail to meet corresponding one or more flow requirements 146 retrieved from storage module 138. Notification module 142 can, for example, include one or more machine-readable storage mediums, such as medium 136, and one or more computer processors, such as processor 134.

In some implementations, notification module 142 can notify only the application without providing a corresponding notification to an operator, such as a network administrator. In some implementations, however, notification module 142 can include one or more output devices for notifying an operator. For example, in some implementations, notification module 142 can include hardware in the form of a computer monitor, related firmware, and other software for allowing the computer monitor to operatively communicate with other hardware of SDN controller 102.

For example, in some implementations, notification module 142 can generate instructions to display a notification on the screen of the computer module when one or more flow capabilities 144 retrieved from storage module 138 fail to meet corresponding one or more flow requirements 146 retrieved from storage module 138. Notification module 142 can be used to generate instructions to display other notifications on the screen of the computer module as desired, such as a notification identifying a flow requirement of flow requirements 146 that was determined as not being met by a network data path element, or a notification identifying specific network data path elements that support a specific flow requirement of flow requirements 146.

Notification module 142 can include other forms of output hardware and software. For example, in some implementations, notification module 142 does not include a computer monitor itself, but does include hardware in the form of a display port and/or video card. In some implementations, notification module 142 can additionally or alternatively include hardware in the form of a computer printer and/or printer port, related firmware, and other software for allowing a printer to operatively communicate with other hardware of computing system 132. Notification module 142 can further include a speaker, light, or other output device to provide audible, visual, or other notifications.

FIG. 5 illustrates an example of SDN controller 102 connected to a network data path element in the form of an SDN-compatible network switch 106. Although a specific network switch of SDN 100 is used in this implementation as a network data path element, it is appreciated that the description may be relevant to other switches in SDN 100 or the use of other types of network data path elements. Moreover, the description of SDN controller 102 and switch 106 refer to elements of SDN 100 for illustration, however, it is appreciated that SDN controller 102 and switch 106 can be used for any suitable network.

SDN controller 102 as depicted in FIG. 5 includes storage module 138, comparison module 140, and notification module 142, which are described above with respect to FIG. 4. SDN controller 102 of FIG. 5 further includes a communication module 148 that includes a combination of hardware and software to allow SDN controller 102 to communicate with network nodes of SDN 100. Communication module 148 can be implemented for use as a wired or wireless communication interface. In some implementations, communication module 148 contains one or more physical data ports 150 to connect to elements of SDN 100. For example, in some implementations, communication module 148 can be in the form of a network interface controller having an Ethernet port.

In some implementations, SDN controller 102 can include an I/O module to allow communication to and from SDN controller 102. Example of suitable I/O modules can include modules for monitors, printers, keyboards, mouses, styluses, touchscreens, speakers, etc. I/O devices for such modules can be connected to elements of SDN controller 102 via wired or wireless links.

Switch 106 can contain multiple ports 152, 154, 156, and 158 in operation with a processor module 160 and a storage module 162 to allow switch 106 to store instructions, respond to commands from SDN controller 102, and to forward network traffic to another network node connected to switch 106. It is appreciated that ports 152, 154, 156, and 158 can allow wired or wireless connections to other network devices in SDN 100. For example, in some implementations, one or more of these ports can be in the form of Ethernet ports. In some implementations one or more of these ports can be in the form of virtual ports.

Processor module 160 and storage module 162 can operate together to allow switch 106 to extract a set of fields from a received data packet to execute flow routing instructions or for other switch functions. Processor module 160 and storage module 162 can include one or more aspects of other modules described above with respect to FIG. 4, such as storage module 138 and comparison module 140, as well as aspects of hardware described above with respect to FIG. 3, such as processor 134 and computer-readable storage medium 136 described above with respect to computing system 132.

FIG. 6 is a flowchart illustrating a method implemented on an example node manager service 164 and flow manager service 166 for a specific implementation of an SDN controller service for an OpenFlow controller. It is appreciated that this description is not intended to narrow the broad description of the SDN controller service described with respect to FIG. 1-5, but is instead intended to provide a specific example of a method implementing aspects of the service. Node manager service 164 initiates a network update module 168. Node manager service 164 registers a new data path in the network when it recognizes a new OpenFlow switch connected to the network. At step 170, a daemon running on node manager service 164 recognizes that a data path has been added. In some implementations, node manager service 164 periodically queries all devices within its control domain to determine whether any devices were recently added or removed. In such an implementation, the devices can be queried at the same time or at staggered times. Moreover, the period can be a single period (e.g., every 5 seconds) or a variable period, which can depend on network conditions or other factors.

At step 172, node manager service 164 sends a request for table features to the added network data path element. For example, for an OpenFlow switch, node manager service 164 can send an OFPMP_TABLE_FEATURES message with an empty body to a newly added switch). At step 174, node manager service 164 parses a reply message from the switch. The reply message includes the number flow tables, flow capacities of each of those flow tables, the packet match and modification capabilities of those flow tables. At step 176, node manager service 164 updates a capabilities database 178 with a new set of tables and flow table max sizes associated with the added data path and at step 180 triggers a flow manager module 182. In the event that the SDN controller recognizes that a data path is removed (e.g., in certain conditions when an OpenFlow switch is removed from the network), at step 184, node manager service 164 can update capabilities database 178 to remove any tables associated with the removed data path. The above description outlines the exchange between one network switch and a controller daemon. This exchange when repeated with all data path elements in the network would result in population of a database that would be representative of the underlying SDN network's capabilities.

Flow manager service 166 runs a flow manager module 182. At step 186, flow manager service 166 queries for all the existing flows on every data path element identified by a data path ID by sending a request for flow statistics for a given data path. For example, for an OpenFlow SDN, flow manager service 166 can send an OFP_FLOW_STATS_RE-QUEST message). At step 188, flow manager service 166 parses the reply to the flow statistics request. At step 190, flow manager service 166 updates capabilities database 178 with information parsed in step 188, such as the current flow table free space. This can allow flow manager service 166 to determine the current free flow capacity available in each of the advertised flow tables of every data path element in the SDN network. At step 191, flow manager service 166 triggers an application applicability module for all applications. The application applicability module is part of application manager service 192 and uses the information in capabilities database 178 to determine whether a given application can be deployed on the SDN given the flow requirements collected for the application during registration of the application (see, e.g., application registration module 196 described below).

Figure 7:
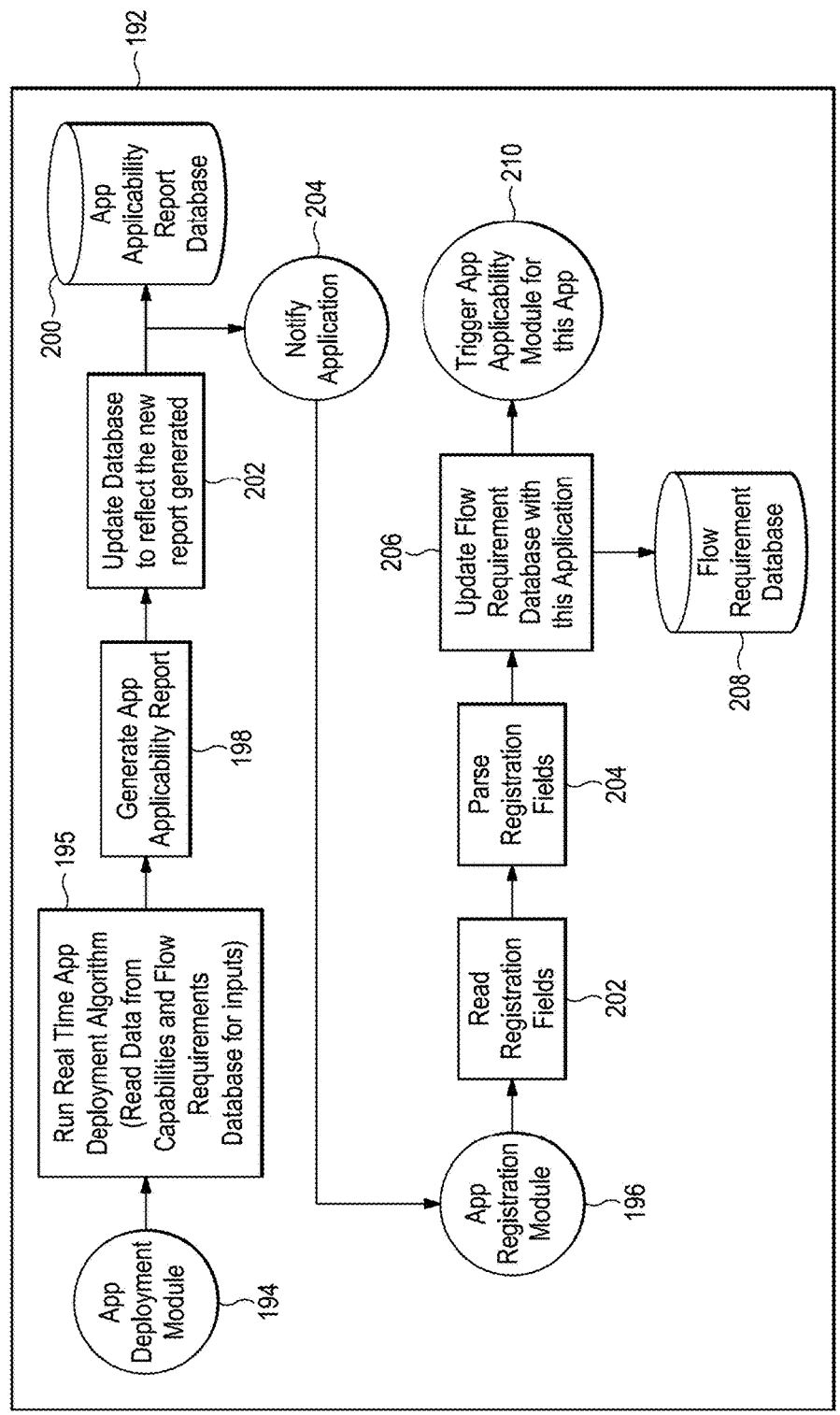
FIG. 7 is a flowchart illustrating an application manager service for an SDN controller service that interfaces with an application deployment module and an application registration module, according to an example.

FIG. 7 is a flowchart illustrating an application manager service 192 that interfaces with an application deployment module 194 and an application registration module 196 as part of a specific implementation of an SDN controller service. As described above with respect to FIG. 6, it is appreciated that this description is not intended to narrow the broad description of the SDN controller service described with respect to FIGS. 1-5, but is instead intended to provide a specific example of a method implementing aspects of the service.

Application manager service 192 can be triggered by flow manager service 166 at step 180 described above with respect to FIG. 6. In some implementations, application manager service 192 can be initiated by another service, or manually via a network administrator or other operator. Application deployment module 194 includes a step 195 of running a real-time application deployment algorithm which reads data from a capabilities and flow requirements database for inputs. In this implementation, the algorithm determines if there are tables available on all the registered data path(s) to support the subscription policy requested by the SDN application both in terms of the packet match-modify capabilities as well as the number of such flow entries required. Depending on the result of the algorithm, the application is notified with a "Yes" or a "No" answer. At step 198, application manager service 192 generates an application applicability report for storage in application applicability report database 200. At step 202, application manager service 192 updates application applicability report database 200. At step 204, application manager service 192 notifies the SDN application based on the generated report.

The application registration module 196 (which runs in parallel with application deployment module in this example) is triggered when an SDN application registers with the application registration service. Application Registration Module 196 exposes northbound interfaces for SDN applications to register themselves with the SDN controller service. The registration mechanism exposes a subscription policy for the application that may require an interested SDN application to provide the following registration fields about the flows that it intends to program on the SDN compatible network data path elements: (a) flow match fields requirement (e.g.: Match {source IP address, destination IP address}); (b) flow packet modifications requirement (e.g.: Action {Decrement TTL}); (c) types of egress actions required (e.g.: Action {Output: Port 20}); (d) number of such flows required per device (e.g.: 16,000 flows). At step 202, application manager service 192 reads registration fields from the SDN applications. At step 204, application manager service 192 parses the received registration fields. At step 206, application manager service 192 updates a flow requirement database 208 with the SDN application. At step 210, application manager service 192 triggers the application applicability module for the SDN application.

Apart from determining whether an SDN application can run successfully in the underlying network, an SDN application can subscribe to the SDN controller service for additional information. For example, such additional information can include: (a) a list of all flow tables in a given data path if multiple such flow tables could support the application requirement (e.g.: Flow Tables {100, 101, 102} in OpenFlow Switch X); (b) a list of data path(s) that do not support the requested application flow requirement on the network, if any (e.g.: OpenFlow Switches Y and Z); (c) Verification support for flows by programming sample flows onto the data path (e.g.: Program 1,000 flows of type [Match {source IP}; Action {Drop}] in Switch X and report any errors); and (d) data path verification of the Flows being installed (e.g.: Verify that Switch X drops traffic according to the OpenFlow rules programmed into it by this service).

An example use case for SDN controller service is provided below. It is appreciated that the example use case described below is not intended to narrow the broad description of the SDN controller service described above, but is instead intended to provide a specific example that implements aspects of the service. In this example, an SDN application App-A is installed on an OpenFlow Controller. App-A is a IP-QoS (Quality of Service) based application that requires an OpenFlow rule with the following Match and Action capability: (a) Match {source IP address, destination IP address}; and (b) Action {Set-field: Modify IP-Differentiated Services Code Point (DSCP), Output: NORMAL}. App-A further requires a scale of 1000 rules per device.

In this example, the underlying OpenFlow network consists of three network switches, switch X and Y from the same vendor (which have first and second hardware capabilities) and switch Z from a different vendor (which has a third hardware capability). When App-A is deployed on the Controller, it may be difficult for the network administrator to know whether all the underlying switches X, Y and Z can support the flow requirements of App-A without relying on the documentation of the switches.

In this example, switch Y in this example network does not allow a modify IP-DSCP action and Switch Z does not support a scale of 1,000 flows on the flow table that can support this type of flow. App-A, however, requires switches that can provide this functionality. In this example, any services offered by App-A relating to this functionality may be disabled, or App-A itself can return an error message. If a second SDN application App-B is planned to be installed on the same SDN controller, the administrator will need to separately determine whether this new application can be successfully deployed on the network. A similar situation will occur if a different model of switch is being added to the underlying network from a different vendor or if an existing switch is being upgraded to a different firmware which could potentially add more capabilities.

Through the use of certain implementations of the controller service described herein, SDN applications App-A and App-B would first register with the service and specify each of their flow requirements via a subscription policy. The service would then notify App-A that it cannot run successfully over the entire network since switch X can't support such an action and switch Z doesn't support the scale requirement of the application. Certain implementations of the disclosure provided herein can provide certain advantages. For example, certain implementations can provide a programmatic way for an SDN application to determine if its flow requirements can be met in the underlying network. Certain implementations can spare network administrators from having to manually test via trial and error mechanisms to check if a new SDN application can be deployed on the network. Certain implementations can provide run time notifications to applications if a network topology change causes the application to no longer work because its requirements can no longer be met on all the underlying SDN compatible devices. Certain implementations can provide suggestions on the best fit tables provided to SDN applications based on their flow requirements on each of the data path elements in the network. Certain implementations can provision data path validation of the flow signatures on the underlying switches in the network.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. As but one example, storage module 138 of SDN controller 102 can include aspects of comparison module 140 and vice versa.

As used herein, the term "provide" includes push mechanisms (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes.

Furthermore, it should be understood that the systems, apparatuses, and methods described herein can include various combinations and/or sub-combinations of the components and/or features of the different implementations described. Thus, features described with reference to one or more implementations can be combined with other implementations described herein.

What is claimed is:

1. A method comprising:
    accessing a flow capability database that contains flow capability information for flow paths along network data path elements in the control plane of a Software-Defined Network (SDN) controller;
    determining network compatibility for an application to be run on the SDN controller based on the accessed flow capability database and whether flow capability requirements for the application are met by a flow path;
    notifying the application when a determination is made that the flow capability requirements for the application are not met by a flow path;
    receiving, with the SDN controller, an indication that a network data path element has been added to a control domain of the SDN controller;
    querying the added network data path element regarding its table capabilities;
    receiving table capability information for the added network data path element;
    determining flow capability information for the added network data path element based on the received table capability information for the added network data path element; and
    storing in the flow capability database the determined flow capability information for the added data path element.

2. The method of claim 1, further comprising:
    querying each network data path element n the control plane of the SDN controller regarding its table capabilities;
    receiving table capability information for each queried network data path element;
    determining flow capability information for each queried network data path element based on the received table capability information for each queried network data path element; and
    storing in the flow capability database the determined flow capability information for each queried network data path element.

3. The method of claim 1, wherein the flow capability requirements include a flow match field requirement, a flow packet modifications requirement, a type of egress action requirement, and a number of flows requirement.

4. The method of claim 1, further comprising:
    receiving, with the SDN controller, an indication that a network data path element has been removed from a control plane of the SDN controller;
    updating the flow capability database to remove the flow capability information for the removed network data path element.

5. The method of claim 1, wherein the network data path elements are network switches.

6. The method of claim 1, wherein the table capability information includes information regarding the number of flows supported in a flow table for the network data path element.

7. The method of claim 1, wherein the table capability information includes information regarding whether the network data path element is capable of modifying metadata of a packet received by the network data path element.

8. The method of claim 1, further comprising:
    providing the application with a list of flow tables on each data path that support the flow capability requirements.

9. The method of claim 1, wherein the act of notifying the application includes identifying a flow capability requirement that was determined as not being met by a network data path element.

10. A Software-Defined Networking (SDN) controller comprising:
    a processor; and
    a memory including instructions that, when executed by the processor, cause the SDN controller to:
        store flow capabilities for flow paths along controlled network switches;
        store flow requirements for an application to be run on the SDN controller;
        determine network compatibility for the application based on whether a flow capability for a flow path accessed from the storage module fails to meet a flow requirement retrieved from the storage module;
        send an error message to the application when a flow capability retrieved from the storage module fails to meet a flow requirement retrieved from the storage module;
        request switch capabilities for a network switch that has been added to a control domain of the SDN controller; and
        store switch capabilities for the added network switch.

11. The SDN controller of claim 10, further comprising:
    a network port to communicate with network switches in the control domain of the SDN controller.

12. The SDN controller of claim 10, wherein the instructions further cause the SDN controller to:
    determine whether every switch requirement for each application to be run on the SDN controller is met by every corresponding switch capability for each network switch in the control domain of the SDN controller, and send an error message to the application when any switch capability fails to meet any switch requirement.

13. A non-transitory machine-readable storage medium encoded with Software-Defined Network (SDN) controller service instructions executable by a processor to:
- access a flow capability database that contains flow capability information for flow paths along controlled network data path elements;
- determine network compatibility an application to be run on the SDN controller based on the accessed flow capability database and whether flow capability requirements for the application are not met by network data path elements in a flow path;
- notify the application when it is determined that the flow capability requirements for the application are not met by network data path elements in a flow path;
- request switch capabilities for a network switch that has been added to a control domain of the SDN controller; and
- store switch capabilities for the added network switch.

* * * * *